US009381919B2

(12) United States Patent
Gerdt

(10) Patent No.: US 9,381,919 B2
(45) Date of Patent: Jul. 5, 2016

(54) METHOD AND ARRANGEMENT FOR ENTERING A PRECEDING VEHICLE AUTONOMOUS FOLLOWING MODE

(71) Applicant: VOLVO LASTVAGNAR AB, Göteborg (SE)

(72) Inventor: Philip Gerdt, Hisings Backa (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/850,171

(22) Filed: Sep. 10, 2015

(65) Prior Publication Data

US 2016/0001777 A1 Jan. 7, 2016

Related U.S. Application Data

(62) Division of application No. 13/879,031, filed as application No. PCT/SE2010/000242 on Oct. 12, 2010, now Pat. No. 9,187,095.

(51) Int. Cl.
| | |
|---|---|
| *G06F 17/10* | (2006.01) |
| *B60Q 1/00* | (2006.01) |
| *B60W 30/165* | (2012.01) |
| *G05D 1/00* | (2006.01) |
| *G08G 1/017* | (2006.01) |
| *G08G 1/16* | (2006.01) |
| *B60W 30/16* | (2012.01) |
| *B60W 10/04* | (2006.01) |
| *B60W 10/18* | (2012.01) |
| *B60W 10/20* | (2006.01) |
| *G05D 1/02* | (2006.01) |

(52) U.S. Cl.
CPC ............. *B60W 30/165* (2013.01); *B60W 10/04* (2013.01); *B60W 10/18* (2013.01); *B60W 10/20* (2013.01); *B60W 30/16* (2013.01); *G05D 1/0061* (2013.01); *G05D 1/0088* (2013.01); *G08G 1/017* (2013.01); *G08G 1/163* (2013.01); *B60W 2550/408* (2013.01); *B60W 2600/00* (2013.01); *G05D 1/024* (2013.01); *G05D 1/0251* (2013.01); *G05D 1/0257* (2013.01); *G05D 2201/0213* (2013.01)

(58) Field of Classification Search
CPC ..... B60W 10/04; B60W 10/18; B60W 10/20; B60W 2550/408; B60W 2600/00; B60W 30/16; B60W 30/165; G05D 1/0061; G05D 1/024; G05D 1/0251; G05D 1/0257; G05D 2201/0213; G08G 1/017; G08G 1/163
USPC ........ 701/400–541, 23, 41, 36, 301; 340/903, 340/435, 436; 180/168, 169; 342/72, 455; 367/909
See application file for complete search history.

(56) References Cited

U.S. PATENT DOCUMENTS

| | | | | |
|---|---|---|---|---|
| 6,067,031 A | * | 5/2000 | Janky | G08G 1/166 180/169 |
| 2009/0018721 A1 | * | 1/2009 | Mian | G01M 17/013 701/31.4 |
| 2010/0131168 A1 | * | 5/2010 | Maruyama | B60T 7/22 701/96 |

*Primary Examiner* — Muhammad Shafi
(74) *Attorney, Agent, or Firm* — WRB-IP LLP

(57) ABSTRACT

A method for entering a preceding vehicle autonomous following mode includes the steps of registering and identifying at least one preceding vehicle in front of a host vehicle by at least a first and a second sensor device, comparing the preceding vehicle with vehicle data in a remote database system, and upon a match establishing a communication channel between the preceding vehicle and the host vehicle, identifying to an operator of the host vehicle preceding vehicles with which the communication channel has been established, and obtaining from the operator a selection of a target vehicles to engage following of Finally, autonomous following mode of the target vehicle is engaged, wherein a vehicle control system automatically controls at least the following three main functions of the host vehicle: forward propulsion, steering, and braking.

1 Claim, 2 Drawing Sheets

METHOD AND ARRANGEMENT FOR ENTERING A PRECEDING VEHICLE AUTONOMOUS FOLLOWING MODE

The present application is a divisional of U.S. patent application. Ser. No. 13/879,031, filed Apr. 12, 2013, as the U.S. national stage of International Application No. PCT/SE2010/000242, filed Oct. 12, 2010, both of which are incorporated by reference.

BACKGROUND AND SUMMARY

The present invention relates to a method for entering a preceding vehicle autonomous following mode, and an arrangement for entering and operating a preceding vehicle autonomous following mode.

Adaptive vehicle cruise control systems for maintaining a set speed of the vehicle, and to adapt the vehicle speed upon approaching a slower vehicle from behind are well-known. Such adaptive systems however only to a small extent reduce risk of collision, reduce fuel consumption and increases driver comfort.

Document US 2007/0083318 A1 discloses a method and system to control forward movement of a vehicle, where a preceding target vehicle is automatically followed. The system involves a dedicated short-range communications (DSRC) protocol for communicating with the preceding vehicle, forward looking sensors, and control of engine and braking when the system operates in an automatic following routine.

The problems with the solution according to the prior art are that driver comfort is low due to the partial restriction of driver responsibility, and that communication between the vehicles is restricted to ad-hoc dedicated short-range communication, which can be difficult to manage and deploy, and lack of necessary communication reliability.

There is thus a need for an improved method and arrangement for entering preceding vehicle autonomous following mode that removes the above mentioned disadvantages.

It is desirable to provide a method and arrangement for entering and operating a preceding vehicle autonomous following mode, where the previously mentioned problems are partly avoided.

According to an aspect of the invention, a method is provided comprising the steps of registering at least one preceding vehicle in front of a host vehicle by means of at least a first and a second sensor device, identifying said at least one preceding vehicle, comparing said at least one preceding vehicle with vehicle data in a remote database system, and upon match establishing a communication channel between said at least one preceding vehicle and said host vehicle, identifying to an operator of said host vehicle preceding vehicles with which said communication channel has been established, obtaining from said operator of said host vehicle a selection of a target vehicle to engage following of, and engaging autonomous following mode of said target vehicle, wherein a vehicle control system automatically controls at least the following three main functions of said host vehicle: forward speed, steering, and braking.

According to another aspect of the invention, an arrangement is provided comprising at least a first and a second sensor device for registering at least one preceding vehicle in front of a host vehicle, a vehicle control system for identifying said at least one preceding vehicle, a remote database system comprising vehicle data with which said at least one preceding vehicle is compared, such that a communication channel is established upon match between said at least one preceding vehicle and said host vehicle, an identifying device with which preceding vehicles with which said communication channel has been established are identified to an operator of said host vehicle, obtaining part for obtaining from said operator a selection of a target vehicle to engage following of and a vehicle control system which controls at least the following three main functions of said host vehicle: forward speed, steering, and braking, for operation said host vehicle in an autonomous following mode.

By comparing the identity of the preceding vehicle with vehicle data in a remote database system, and upon match establishing a communication channel between the preceding vehicle and the host vehicle, establishment of initial vehicle to vehicle communication is simplified, communication can be established by means of any desired communication protocol, deployment and upgrades are managed centrally, vehicles included the database system can be better controlled and observed, services may be provided to the members of the database system via the communication channel, and wireless communication unification is assured. Hence, a more reliable and secure communication is achieved that is easy to manage and upgrade.

Furthermore, the vehicle control system automatically controls all three main functions of said host vehicle, namely forward speed, steering, and braking for improved driver comfort and increased safety. Depending on the latency in communication between proceeding vehicle and host vehicle, the range gap between said vehicles can be reduced to a few meters, thus leading to significant reduction of fuel consumption.

BRIEF DESCRIPTION OF THE DRAWINGS

The invention will be described in greater detail below with reference to a preferred embodiment shown in the drawings, in which.

DETAILED DESCRIPTION

In the following a preferred embodiment of the invention is shown and described, simply by way of illustration of one mode of carrying out the invention.

Figure 1:
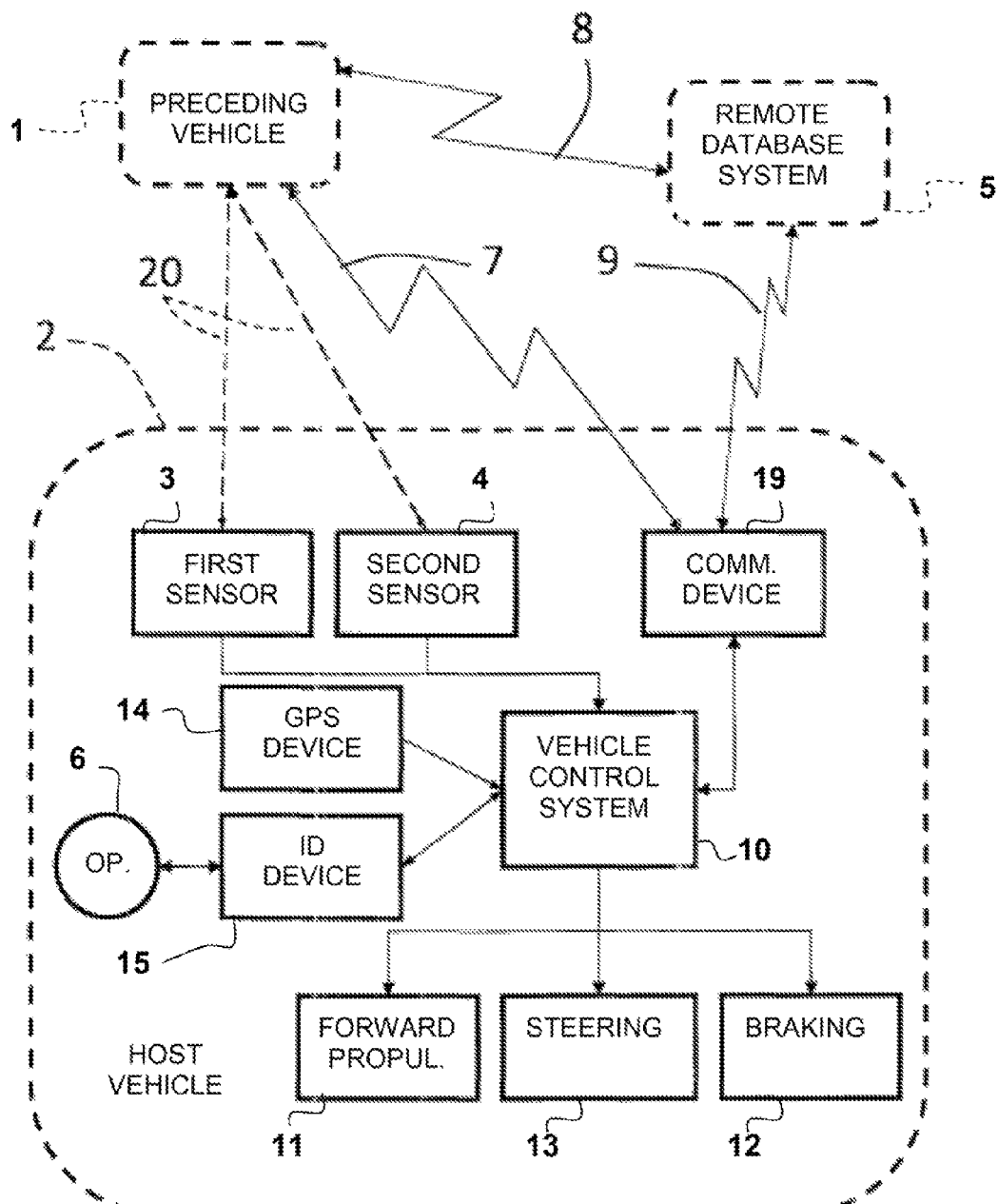
FIG. 1 shows an arrangement for entering and operating a preceding vehicle autonomous following mode according to the invention.

FIG. 1 shows a schematic view of the inventive arrangement for entering and operating a preceding vehicle autonomous following mode comprising a host vehicle 2, a preceding vehicle 1 and a remote database system 5. The preceding vehicle 1 is preferably a motor vehicle, such as an automobile, bus, or truck driving forward on a road.

The host vehicle 2 comprises an operator 6 driving the host vehicle 2, and vehicle control system 10 for engaging and operating the preceding vehicle autonomous following mode. For this purpose, the vehicle control system 10 receives information about preceding vehicles 1, such as position, speed, type, and identification from first and second sensor devices 3, 4 arranged in the front region of the host vehicle 2.

The first sensor device 3 is an image sensor adapted for object detection and identification, preferably by detecting light from the visible or IR spectrum. The image sensor is preferably used in combination with a digital screen 16 arranged in the cockpit of the host vehicle 2, displaying a real-time image of ahead of the host vehicle 2. The image sensor is preferably also used for identification of a license plate of the preceding vehicle 1, as well as for determining type of preceding vehicle 1, driving lane used by preceding vehicle 1, and possibly also other external factors such as road and weather condition, etc.

The second sensor device 4 is range sensor, such as a RADAR (radio detection and ranging) sensor, or a LIDAR (Light detection and ranging) sensor. The second sensor device 4 is thus used to measure the distance to preceding vehicles 1 within the operating range and operating angle of the second sensor device 4. Based on information of absolute position and speed of the host vehicle 2 received from a GPS-device 14, or a differential GPS-device, arranged on the host vehicle 2, the vehicle control system 10 can determine absolute position and absolute speed of preceding vehicles 1 by fusing sensor information 20 received from the first and second sensor devices 3, 4. Sensor information fusion can be implemented using several different well-known fusion algorithms, such as a Kalman filter. Sensor information fusion may also be performed by embedded microcomputer systems arranged near to the first and second sensor devices 3, 4, thus transmitting processed data to the vehicle control unit 10 relating to relative or absolute position or speed of preceding vehicles 1, as well as their identity.

The host vehicle 2 may of course be provided with additional sensor devices for further improving the reliability of the determined position, speed and identity of preceding vehicles 1. For example, a second image sensor arranged with a different viewpoint compared with the first image sensor would allow stereoscopic vision of ahead of the host vehicle 2, thus further improving range and position estimation of preceding vehicles 1.

Alternatively, or in combination with a second image sensor, an additional range sensor, such as a RADAR or LIDAR sensor can be provided in the host vehicle 2 for improved measurement certainty.

The inventive method and arrangement need to uniquely recognise the identity of the preceding vehicles 1 for comparing the identity of the
preceding vehicles 1 with data in a remote database system 5. The identity of preceding vehicles 1 can be in form of an identifier of a license plate, a visual identifier of another type of unique marking, an electronic identifier such as radio-frequency identification (RFID), in which case a further sensor device is required in form of a RFID reader arranged on the host vehicle 2. The identifier can be permanently or temporarily attached to the preceding vehicle 1. Yet another option for determining a unique identity is to accurately estimate the position of the preceding vehicle 1, for example in terms of latitude and longitude, possibly also including additional preceding vehicle 1 attributes such as speed, heading, driving lane, and type.

The remote database system 5 is a stationary database system managed by a supplier, and connectable to vehicles using wireless communication 8, 9, for example in form of wireless cellular radio network communication, such as GSM. The database system 5 comprises a database, which holds data of member vehicles of the database. Data of the database includes a unique identity of each vehicle of the database. This data can be in the form of an identifier of a license plate, an absolute position, or the like, as mentioned above. In case the identifier consists of or comprises an absolute position, frequent update of the position is required to hold the database accurate and valid, for example every five seconds. Preferably, the timestamp of the update is also pan of the vehicle database to enable vehicle position estimation at each instant in combination with speed and heading of said vehicle. Continuous communication 8, 9 or on-request communication 8, 9 between member vehicles and database system 5 is possible. To register a non-member vehicle as a member to the database, a communication routine is set up for managing the communication 8, 9 between the vehicle and the database system 5, and connection data for establishing vehicle to vehicle communication 7 without database system routing can optionally also be stored in the database.

A main aspect of the invention is to establish a secure, reliable and high speed wireless communication channel 7, 8, 9 between the host vehicle 2 and the preceding vehicles 1 that are identified by the host vehicle 2 and being members of the database. Hence, simultaneous communication with more than one preceding vehicle 1 is possible before selection of a target vehicle to engage autonomous following of, for the purpose of providing the operator 6 of the host vehicle 2 with the widest possible choice of target vehicles.

A first possible implementation of such a communication channel 7, 8, 9 between the host and target vehicles 1, 2 is based on said vehicle to database communication 8, 9, wherein data from the preceding vehicle 1 is transmitted to the host vehicle 2 via the database system 5, and oppositely. This type of communication 8, 9 is thus configured as a three-part communication routed via the database system 5. The advantage of this type of implementation is low cost because no further investments are required for any wireless point-to-point communication between the host and preceding vehicle 1, 2, and simple establishment of a communication channel 8, 9.

A second implementation of such a communication between the host and preceding vehicles 1, 2 is based on setting up a direct, vehicle to vehicle communication 7, without routing over the database system 5. The establishment of such a vehicle to vehicle communication channel 7 is based on connection information provided by the database system 5 to the host and preceding vehicles 1, 2. The advantage of this type of implementation is potentially higher communication speed and increased communication reliability because data does no longer need to be transmitted via the database system 5. There are many well-known technical solutions available for providing a wireless vehicle to vehicle communication channel 7. A first solution implemented by means of external cellular communication network, such as GSM, or a dedicated short-range communication (DSRC) system. A second solution is implemented by means of a direct wireless point-to-point communication channel 7 between the host and preceding vehicle 1, 2, wherein each of said vehicles 1, 2 is provided with a suitable transceiver for transmitting and receiving data directly between said transceivers of said vehicles 1, 2. The direct communication channel 7 can be based on radio wave communication, such as millimeter wave radio link, or optical communication, such as free-space optical links using infrared laser light or LED. This alternative has the advantage of being independent of an external cellular communication network, and having the potential of very high speed communication.

A third implementation of such communication can be based on a combination of communication with and without routing via the database system 5, depending for example on the type of data transferred.

Figure 2:
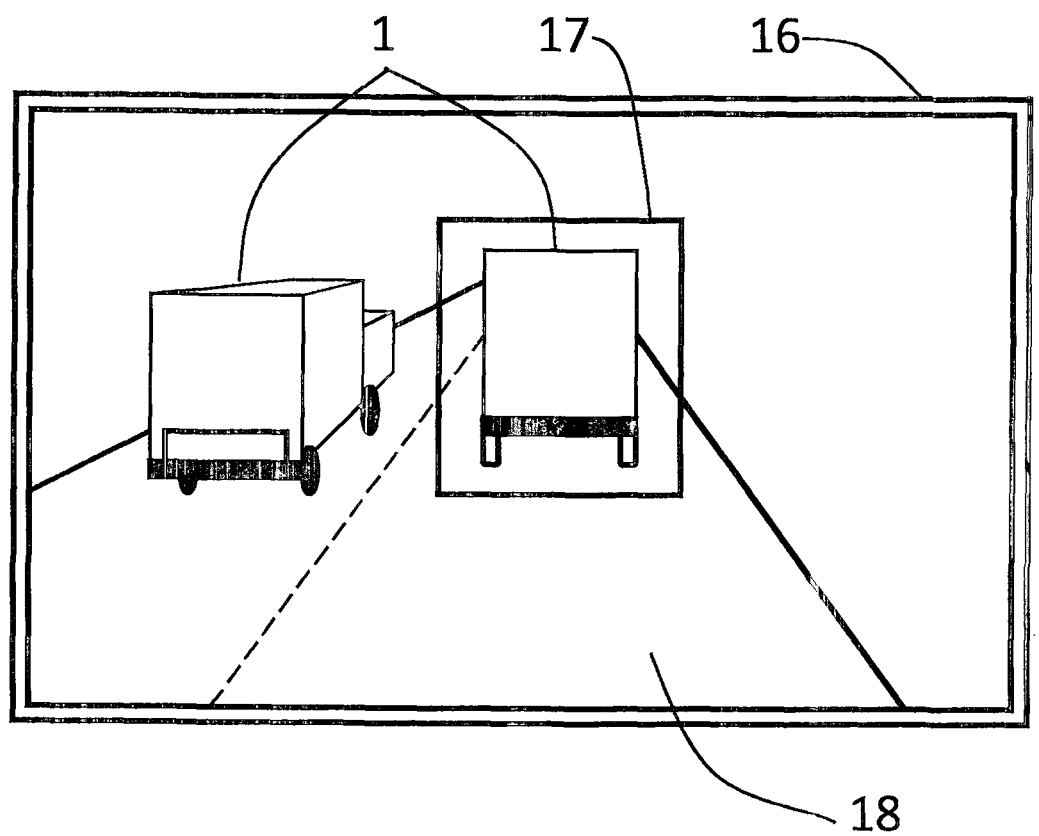
FIG. 2 shows a digital screen displaying an image of ahead of the host vehicle according to the invention.

A human-machine interface HI 15 is provided between the vehicle control system 10 and the operator 6 of the host vehicle 2 for informing the operator 6 of the present status, as well as functioning as an obtaining part for obtaining information required to enter and operate an autonomous following mode. For the purpose of entering said mode, information to the operator 6 is provided by an identifying device of the HMI 15 of the existence of preceding vehicles 1, as well as of the possibility to select said preceding vehicles 1 as target vehicles for engaging autonomous following of. The HMI 15 is preferably implemented by means of a digital screen 16 that shows a realtime image of ahead of the host vehicle 2 based on information provided by the first sensor device 3, as illustrated in FIG. 2. Information relating to selection of a target vehicle, as well as setting a preferred range gap to the target vehicle, can be inputted by the operator 6 using any type of input-device. Preferably, said input-device is implemented by arranging said digital screen 16 as a touchscreen.

The possibility to select a target vehicle out of the preceding vehicles 1 is dependent on the system's capability to first identify said preceding vehicles 1, and subsequently establishing a wireless data communication channel 7, 8, 9 with said preceding vehicles 1. Only after said communication 7, 8, 9 have been established is it possible for the operator 6 to select any preceding vehicle 1 as target vehicle.

The status of preceding vehicles 1 can thus be divided in three levels: First level—not identified preceding vehicle 1, Second level—identified preceding vehicle 1 without established communication channel 7, 8, 9 thereto; and third level—identified preceding vehicle 1 with established communication channel 7, 8, 9 thereto. In the present embodiment of the invention as illustrated in FIG. 2, the third status level is indicated to the operator 6 of the host vehicle 2 by displaying a frame 16 having a first colour surrounding a preceding vehicle 1 in the digital screen 16, the second status level is indicated by displaying a frame 16 having a second colour surrounding said preceding vehicle and the first status level is indicated by the lack of any surrounding frame 16, Many other configurations fix showing selectable preceding vehicles 1 are of course possible within the scope of the invention.

Said preferred range gap between the host vehicle 2 and target vehicle is subsequently adopted as reference gap by said vehicle control system 10 during operation of the autonomous following mode. Said range gap is set such that the range between said target vehicle and said host vehicle 2 during engaged autonomous following mode at speeds above 50 km/h, preferably above 70 km/h, is less than 30 meters, preferably less than 15 meters, and more preferably less than 5 meters. The minimum allowed range gap depends on at least speed of target vehicle and communication latency between target vehicle and host vehicle 2, and is selected to provide a certain safety level. With reduced target vehicle speed, range gap can also be reduced with maintained safety level. Furthermore, with reduced communication latency, the range gap can also be reduced with maintained safety level. The operator 6 can of course set a time gap instead of a range gap if desired.

Subsequent obtaining information of operator 6 selection of target vehicle, the vehicle control system 10 takes control over at least the main power plant for vehicle forward propulsion, steering system, and braking functions, such that the vehicle control system 10 can operate the host vehicle 2 in an autonomous following mode. Control of the vehicle forward propulsion implies control of throttle valve position and/or fuel injection, and control of the braking functions refers to vehicle de-acceleration achieved by standard friction brakes, motor brake, exhaust brake, electric generators, and different types of retarders, or the like.

To operate the host vehicle 2 in an autonomous following mode, the vehicle control system 10 receives information from the first and second sensor devices 3, 4, the GPS 14, preferably in combination with digital maps, as well as driving information pertaining to the target vehicle 1 via a wireless communication device 19 and the established communication channel 7, 8, 9. Said driving information can comprise speed, acceleration, braking actuation, braking pressure, engine data, target destination, cargo data and driving mode of the target vehicle.

Instead of a GPS-device 14, it is also possible to obtain a reasonable position estimate of the host vehicle 2 using recorded route data in combination with an inertial navigation system, such as road inclination sensors, gyros and/or accelerometers. Intercommunication between parts of the system of the host vehicle 1 is realized by means of a LAN or the like.

The method for entering and operating the preceding vehicle autonomous following mode will now be described. The first sensor device 3 continuously sends image information to the digital screen 16 via the vehicle control system 10. Hence, the digital screen 16 displays an image of ahead of the host vehicle 3 to the operator 6.

In a first step, the first and second sensor devices 3, 4 register preceding vehicles 1 in front of the host vehicle 2, and transmit sensor information 20, such as range, angular position, possible license plate identifier or other type of identifiers to the vehicle control system 10. The vehicle control system 10 fuses sensor information 20 received from the first and second sensor devices 3, 4, and attempts to identify the preceding vehicle 1. When a preceding vehicle 1 has been identified, optionally taking into account the position the host vehicle 2 using for example a GPS-device 14, an enquiry is transmitted to the remote database system 5 by means of a communication device 19 of the host vehicle and a communication channel 9. This communication channel 9 can be set up for each enquiry, or remain permanently operational depending on the specific needs of the system. Furthermore, upon identification of the preceding vehicle 1, a red frame 17 appears around the identified preceding vehicle 1 in the digital screen 16 as a status indication to the operator 6 of the host vehicle 2 that the indicated preceding, has been identified by the vehicle control system 10.

The database system 5 subsequently compares the received identity of the registered preceding vehicle 1 with vehicle data in the remote database system 5. Depending, in what type of identity is used by the inventive system, the database system 5 will compare identifiers of license plates, other visual or electronic identifiers, absolute position of vehicles, etc. Upon match, a communication channel 7, 8, 9 is established between the identified preceding vehicle 1 and the host vehicle 2, which communication channel 7, 8, 9 is either routed via the database system 5, or is established without routing via the database system 5. Furthermore, upon establishment of a communication channel 7, 8, 9 with the preceding vehicle, said red frame 17 turns into a green frame 17 as a status indication to the operator 6 that the indicated preceding vehicle 1 now can be selected as target vehicle for entering autonomous following of.

Should the operator 6 want to engage autonomous following mode of a preceding vehicle surrounded by a green frame 17 on the digital screen 16, the operator 6 simply touches the digital touchscreen 6 within the displayed a frame 17 of said preceding vehicle 1 to select and confirm that the vehicle control system 10 is commanded to take control over propulsion, steering and braking function of the host vehicle 2, and to operate the host vehicle 2 in autonomous following mode having the selected preceding vehicle 1 as target vehicle.

The reference range gap to the preceding vehicle 1 can either be predetermined and for example be dependent on speed and communication latency, or be set by the operator 6 upon request of the vehicle control system 10 each time entering the autonomous following mode, for example by means of the digital screen 16.

To disengage autonomous following mode and return to operator driving more, the operator 6 can for example actuate any of the accelerator pedal, brake pedal, or steering wheel.

It is possible that more than one preceding vehicle 1 is registered by the inventive system simultaneously. Such a situation is illustrated in FIG. 2, where two preceding, vehicles 1, one in each lane of the road 18, are displayed on the digital screen 16. The vehicle control system 10 can preferably execute the different steps of the method for entering and operating the autonomous following mode substantially simultaneously for each of said two preceding vehicles 1. It is thus possible that the operator 6 has the option of selecting a target vehicle out of several selectable preceding vehicles 1.

As will be realised, the invention is capable of modification in various obvious respects, all without departing from the scope of the appended claims.

Accordingly, the drawings and the description thereto are to be regarded as illustrative in nature, and not restrictive. Reference signs mentioned in the claims should not be seen as limiting the extent of the matter protected by the claims, and their sole function is to make claims easier to understand.

The invention claimed is:

1. An arrangement for entering and operating a preceding vehicle autonomous following mode, comprising:
   at least a first sensor device on a host vehicle for detection and identification of at least one preceding vehicle in front of the host vehicle and a second sensor device on the host vehicle for measuring distance to the at least one preceding vehicle;
   a vehicle control system for determining position and speed of at least one preceding vehicle based on information received from the first and second sensors;
   a remote database system comprising vehicle data with which the identification information concerning the at least one preceding vehicle is compared, the remote database system being arranged to determine whether there is a match between the at least one preceding vehicle with the vehicle data and, upon identifying a match, establish a communication channel between the at least one preceding vehicle and the host vehicle;
   an identifying device for identifying to an operator of the host vehicle the at least one preceding vehicle with which the communication channel has been established;
   an obtaining part for obtaining from the operator a selection of a target vehicle from among preceding vehicles with which the communication channel has been established to engage following of; and
   the vehicle control system being arranged to automatically control at least forward propulsion, steering, and braking of the host vehicle for operation of the host vehicle in an autonomous following mode after operator selection of the target vehicle for autonomously following the target vehicle.

* * * * *